US012591191B2

(12) United States Patent
Ohara et al.

(10) Patent No.: US 12,591,191 B2
(45) Date of Patent: Mar. 31, 2026

(54) SLIDING MEMBER WITH SPACED GROOVES, FIXING DEVICE, AND IMAGE FORMING APPARATUS

(71) Applicant: FUJIFILM Business Innovation Corp., Tokyo (JP)

(72) Inventors: Hideaki Ohara, Kanagawa (JP); Kenji Omori, Kanagawa (JP); Ryohei Yoshikawa, Kanagawa (JP); Taiki Nagamatsu, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 18/939,414

(22) Filed: Nov. 6, 2024

(65) Prior Publication Data

US 2025/0199442 A1 Jun. 19, 2025

(30) Foreign Application Priority Data

Dec. 14, 2023 (JP) ................................ 2023-211368
Aug. 16, 2024 (JP) ................................ 2024-137038

(51) Int. Cl.
*G03G 15/20* (2006.01)

(52) U.S. Cl.
CPC ..... *G03G 15/2025* (2013.01); *G03G 15/2064* (2013.01)

(58) Field of Classification Search
USPC .......................................................... 399/320
See application file for complete search history.

(56) References Cited

U.S. PATENT DOCUMENTS

| | | | | |
|---|---|---|---|---|
| 6,456,819 | B1 | 9/2002 | Abe et al. | |
| 10,962,908 | B2 | 3/2021 | Yamaguchi et al. | |
| 2019/0243293 | A1 | 8/2019 | Tanaka et al. | |
| 2019/0377291 | A1* | 12/2019 | Maeda ............... | G03G 15/2057 |

FOREIGN PATENT DOCUMENTS

| | | |
|---|---|---|
| EP | 3380895 | 9/2023 |
| JP | 2001042670 | 2/2001 |
| JP | 2020197669 | 12/2020 |
| JP | 2022156529 | 10/2022 |

OTHER PUBLICATIONS

"Search Report of Europe Counterpart Application", issued on Mar. 27, 2025, p. 1-p. 9.

* cited by examiner

*Primary Examiner* — Quana Grainger
(74) *Attorney, Agent, or Firm* — JCIPRNET

(57) ABSTRACT

A sliding member includes a central portion of a sliding surface in a width direction provided with plural first grooves at intervals along a width direction of the first grooves, in which an angle formed by a first groove and a sliding direction is 45° or more and 90° or less, and in a case where a cut surface obtained by cutting the sliding member along a direction perpendicular to the first groove and along a thickness direction is observed, an angle A formed by a wall surface of the first groove on a downstream side in the sliding direction and the sliding direction in the first groove is 21° or more and 45° or less.

20 Claims, 8 Drawing Sheets

SLIDING MEMBER WITH SPACED GROOVES, FIXING DEVICE, AND IMAGE FORMING APPARATUS

CROSS-REFERENCE TO RELATED APPLICATIONS

This application is based on and claims priority under 35 USC 119 from Japanese Patent Application No. 2024-137038 filed Aug. 16, 2024, and Japanese Patent Application No. 2023-211368 filed Dec. 14, 2023.

BACKGROUND

(i) Technical Field

The present invention relates to a sliding member, a fixing device, and an image forming apparatus.

(ii) Related Art

For example, JP2022-156529A discloses a sliding member for a fixing device, the fixing device including a rotating member, a belt member rotating together with the rotating member, and a nip forming member forming a nip portion between the nip forming member and the rotating member via the belt member, through which a sheet passes, the sliding member being interposed between the belt member and the nip forming member, and including a sliding contact surface in sliding contact with an inner peripheral surface of the belt member on a sliding surface which is a surface on a side that slides against the inner peripheral surface of the belt member, and a recessed groove recessed with respect to the sliding contact surface, in which the recessed groove has an inclined surface on which a downstream of the belt member in a sliding direction becomes shallower with respect to the sliding contact surface on a groove bottom.

SUMMARY

Aspects of non-limiting embodiments of the present disclosure relate to a sliding member that has low sliding resistance and excellent maintainability of the low sliding resistance, compared to a sliding member including a central portion of a sliding surface in a width direction provided with a plurality of first grooves at intervals along a width direction of the first grooves, in which an angle formed by a first groove and a sliding direction is 45° or more and 90° or less, and in a case where a cut surface obtained by cutting the sliding member along a direction perpendicular to the first groove and along a thickness direction is observed, an angle A formed by a wall surface of the first groove on a downstream side in the sliding direction and the sliding direction in the plurality of first grooves is 21° or more and 45° or less.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

Means for addressing the problems include the following aspects.

According to an aspect of the present disclosure, there is provided a sliding member including:

a central portion of a sliding surface in a width direction provided with a plurality of first grooves at intervals along a width direction of the first grooves, in which an angle formed by a first groove and a sliding direction is 45° or more and 90° or less, and in a case where a cut surface obtained by cutting the sliding member along a direction perpendicular to the first groove and along a thickness direction is observed, an angle A formed by a wall surface of the first groove on a downstream side in the sliding direction and the sliding direction in the first groove is 21° or more and 45° or less.

BRIEF DESCRIPTION OF THE DRAWINGS

Exemplary embodiment(s) of the present invention will be described in detail based on the following figures, wherein.

DETAILED DESCRIPTION

Figure 1:
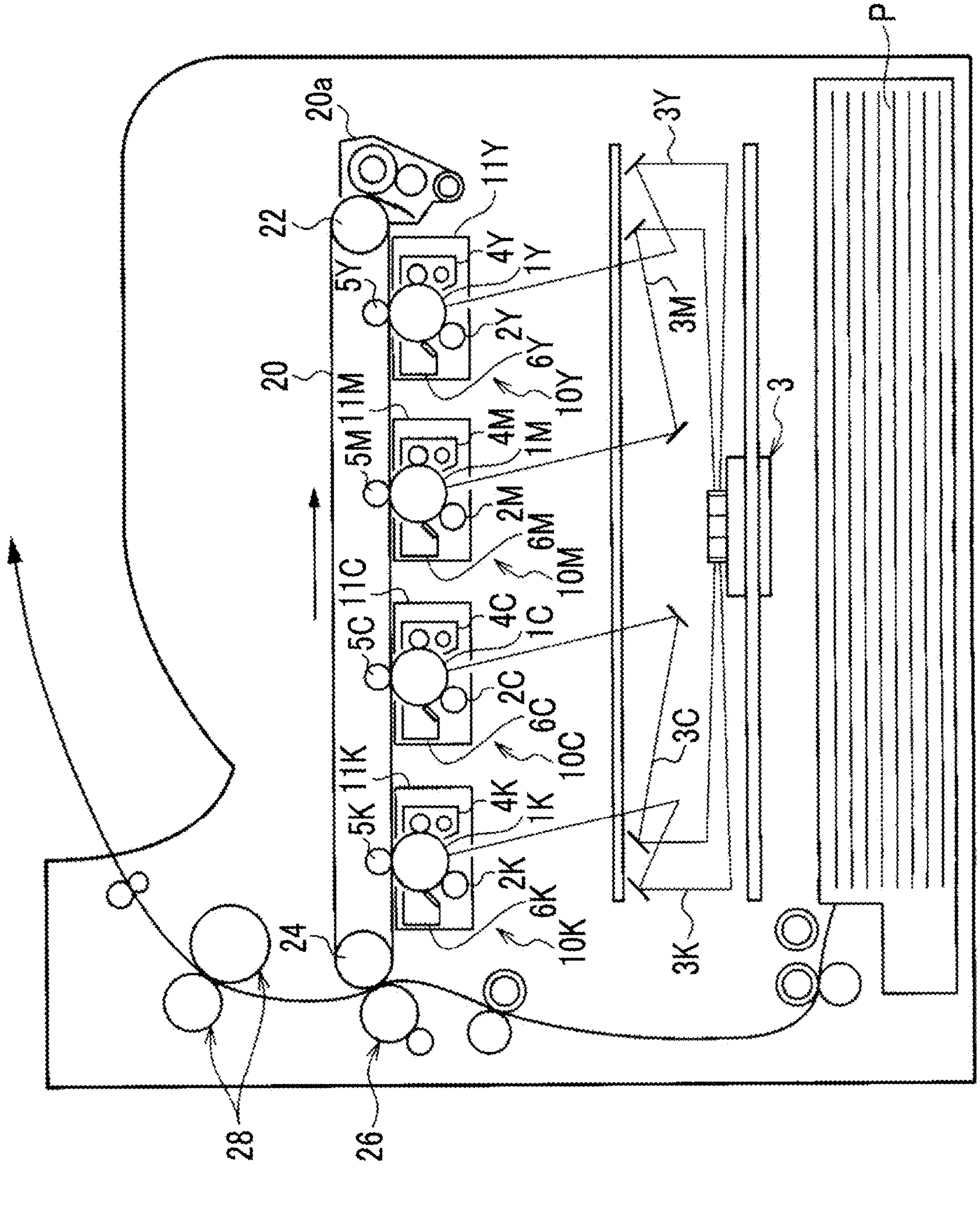
FIG. 1 is a schematic view showing an example of an image forming apparatus according to the present exemplary embodiment.

Hereinafter, exemplary embodiments that are examples of the present invention will be described. The following descriptions and examples merely illustrate the exemplary embodiments, and do not limit the scope of the invention.

Regarding ranges of numerical values described stepwise in the present specification, the upper limit value or lower limit value of a range of numerical values may be replaced with the upper limit value or lower limit value of another range of numerical values described stepwise. In addition, in a range of numerical values described in the present specification, the upper limit value or lower limit value of the range of numerical values may be replaced with a value shown in Examples.

Each component may include a plurality of corresponding substances.

In a case where the amount of each component is mentioned and in a case where a plurality of kinds of substances corresponding to each component are present, the amount means a total amount of the plurality of kinds of substances unless otherwise specified.

In a case where the exemplary embodiments are described with reference to the drawings, the members having substantially the identical function are marked with the same reference numeral throughout the all drawings such that the members will not be redundantly described.

Sliding Member

In the sliding member according to the present exemplary embodiment, a plurality of first grooves are provided at intervals along a width direction of the first grooves in the central portion of the sliding surface in the width direction.

An angle between the first groove and the sliding direction is 45° or more and 90° or less.

In a case where a cut surface obtained by cutting the sliding member along a direction perpendicular to the first groove and along a thickness direction is observed, an angle A formed by a wall surface of the first groove on a downstream side in the sliding direction and the sliding direction in the first groove is 21° or more and 45° or less.

The "direction perpendicular to the first groove" indicates a direction perpendicular to the longitudinal direction of the first groove.

The sliding member according to the present exemplary embodiment is a sliding member having low sliding resistance and excellent maintainability of the low sliding resistance due to the above-described configuration. A reason therefor is presumed as follows.

In the related art, in a sliding member, a technique of providing a plurality of grooves at intervals in a width direction on a sliding surface, which are being arranged along or inclined in the width direction, is known. In a case where the groove is provided, the lubricant is accumulated in the groove, and thus the lubricant is stably supplied to a contact section between the sliding surface of the sliding member and the surface to be slid, and the sliding resistance is reduced.

However, in recent years, in addition to further reducing the sliding resistance, it is required to maintain low sliding resistance.

On the other hand, in the sliding member according to the present exemplary embodiment, in a case where a cut surface obtained by cutting the sliding member along a direction perpendicular to the first groove and along a thickness direction is observed, an angle A formed by a wall surface of the first groove on a downstream side in the sliding direction and the sliding direction in the plurality of first grooves is set to 21° or more and 45° or less.

By setting the angle A to be in the above-described range, the increase in the friction coefficient with the sliding surface due to the provision of the groove is suppressed, and the lubricant accumulated in the groove is stably supplied to the contact section between the sliding surface of the sliding member and the surface to be slid.

From the above, it is presumed that the sliding member according to the present exemplary embodiment is a sliding member having low sliding resistance and excellent maintainability of low sliding resistance.

Hereinafter, the sliding member according to the present exemplary embodiment will be described in detail.

Groove

Figure 3:
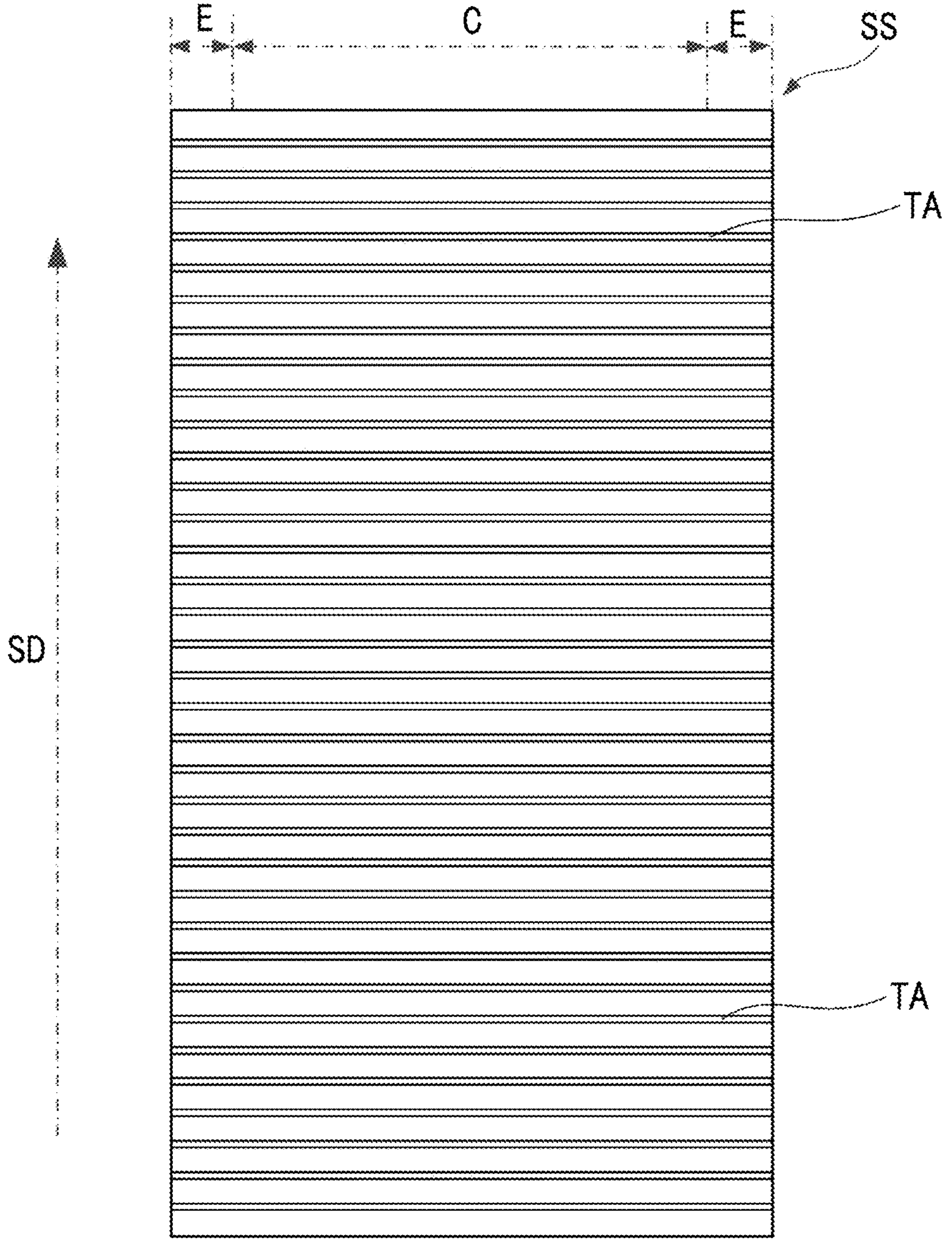
FIG. 3 is a schematic plan view showing an example of a sliding member according to the present exemplary embodiment.

In the sliding member according to the present exemplary embodiment, for example, as the first grooves, a plurality of grooves along the width direction of the sliding surface are provided at intervals along the sliding direction in the central portion of the sliding surface in the width direction (see FIG. 3).

The central portion of the sliding surface in the width direction refers to a region interposed between both end portions of the sliding surface in the width direction, the end portions being regions in which each length from both edges of the sliding member in the width direction toward the center is 18% of the width of the sliding surface.

The plurality of first grooves along the width direction of the sliding surface may be provided in a central portion of the sliding surface in the width direction.

Figure 4:
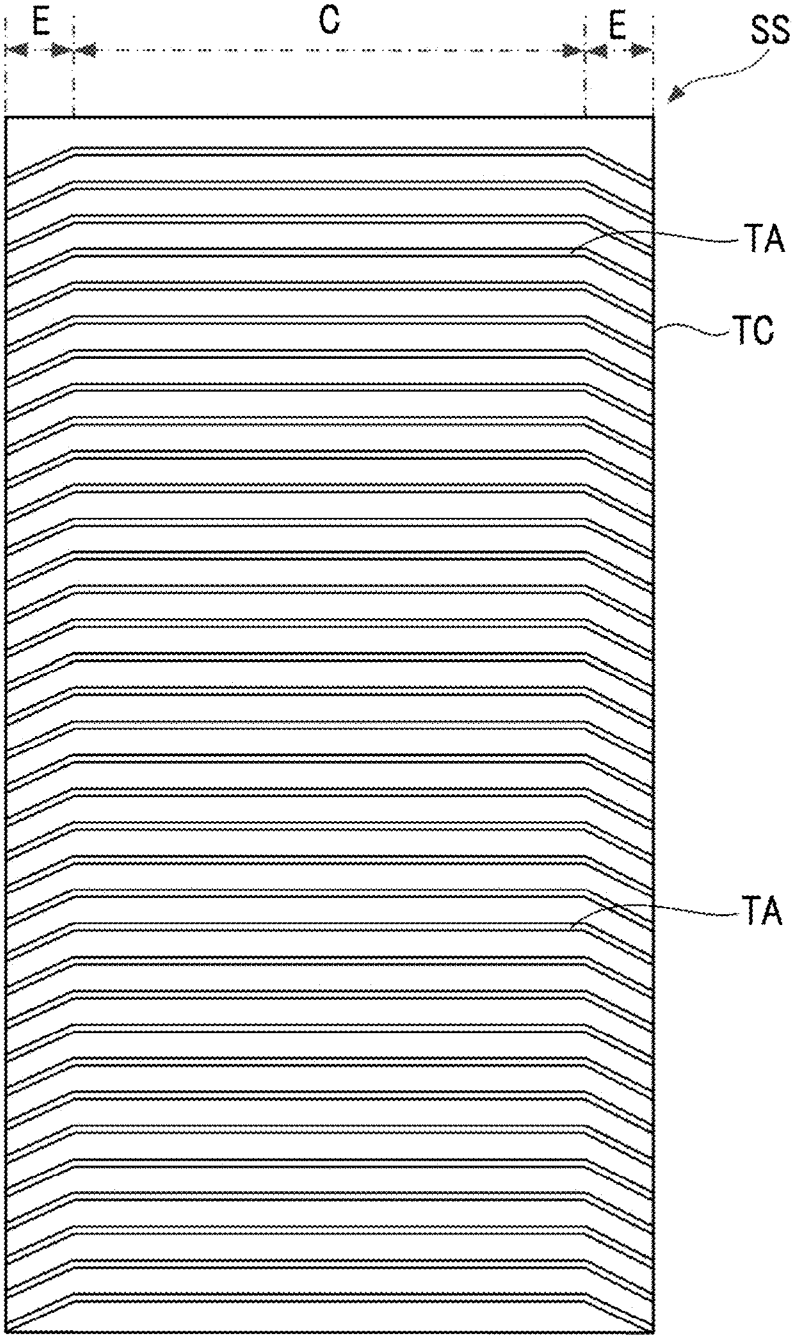
FIG. 4 is a schematic plan view showing another example of the sliding member according to the present exemplary embodiment.

Specifically, the plurality of first grooves along the width direction of the sliding surface may be provided in the central portion and both end portions of the sliding surface in the width direction (see FIG. 3), or may be provided only in the central portion of the sliding surface in the width direction (see FIG. 4).

In a case where the plurality of first grooves along the width direction of the sliding surface are provided only in the central portion of the sliding surface in the width direction, for example, inclined grooves connected to the first grooves in the central portion of the sliding surface in the width direction may be provided at both end portions of the sliding surface in the width direction (see FIG. 4). For example, the inclined groove may be provided to be inclined in the width direction such that the connecting portion is on the upstream side in the sliding direction (see FIG. 4). By providing the inclined groove, the lubricant is less likely to escape from the central portion of the sliding surface in the width direction to both end portions, and the maintainability of the low sliding resistance is increased.

Here, in FIGS. 3 and 4, SS indicates a sliding surface, TA indicates a first groove, TC indicates an inclined groove, C indicates a central portion of the sliding surface in the width direction, E indicates both end portions of the sliding surface in the width direction, and an arrow SD indicates a sliding direction.

In a case where a cut surface obtained by cutting the sliding member along a direction (a sliding direction in the aspect of FIG. 3) perpendicular to the first groove and along a thickness direction is observed, an angle A formed by a wall surface of the first groove on a downstream side in the sliding direction and the sliding direction in the plurality of first grooves is 21° or more and 45° or less. The angle A is, for example, preferably 23° or more and 40° or less, and more preferably 25° or more and 30° or less.

In a case where the angle A is less than 21°, the lubricant retained in the first groove is hardly supplied to the contact section between the sliding surface and the surface to be slid, and the sliding resistance increases.

In a case where the angle A is more than 45°, the friction coefficient with the surface to be slid is increased, and the sliding resistance is increased.

In a case where a cut surface obtained by cutting the sliding member along a direction perpendicular to the first groove and along a thickness direction is observed, the angle B formed by the wall surface of the first groove on the upstream side in the sliding direction and the sliding direction in the plurality of first grooves is, for example, preferably 10° or more and 35° or less, more preferably 15° or more and 30° or less, and still more preferably 12° or more and 25° or less.

In a case where the angle B is 35° or less, the lubricant retained in the first groove is easily supplied to the contact section between the sliding surface and the surface to be slid, the sliding resistance is reduced, and the maintainability of the low sliding resistance is also improved.

In a case where the angle B is 10° or more, the friction coefficient with the surface to be slid is unlikely to increase, the sliding resistance is reduced, and the maintainability of the low sliding resistance is also improved.

From the viewpoint of low sliding resistance and improvement of the maintainability of the low sliding resistance, the difference between the angle A and the angle B is, for example, preferably 5° or more and 30° or less, more preferably 7° or more and 25° or less, and still more preferably 10° or more and 20° or less in terms of absolute value.

In a case where a cut surface obtained by cutting the sliding member along a direction perpendicular to the first groove and along a thickness direction is observed, from the viewpoint of low sliding resistance and improvement of the maintainability of the low sliding resistance, the depth of the first groove is, for example, preferably 15 μm or more and 45 μm or less, more preferably 20 μm or more and 40 μm or less, and still more preferably 25 μm or more and 38 μm or less.

In a case where a cut surface obtained by cutting the sliding member along a direction perpendicular to the first groove and along a thickness direction is observed, from the viewpoint of low sliding resistance and improvement of the maintainability of the low sliding resistance, the width of the first groove is, for example, preferably 70 μm or more and 190 μm or less, more preferably 85 μm or more and 180 μm or less, and still more preferably 100 μm or more and 170 μm or less.

In a case where a cut surface obtained by cutting the sliding member along a direction perpendicular to the first groove and along a thickness direction is observed, from the viewpoint of low sliding resistance and improvement of the maintainability of the low sliding resistance, the pitch of the first groove (that is, the interval between the first grooves) is, for example, preferably 200 μm or more and 900 μm or less, more preferably 300 μm or more and 700 μm or less, and still more preferably 400 μm or more and 500 μm or less.

Here, in a case where a cut surface obtained by cutting the sliding member along a direction perpendicular to the first groove and along a thickness direction is observed, the angle A, the angle B, the depth of the first groove, the width of the first groove, and the pitch of the first groove are defined as follows (see FIG. 5).

The angle A means an angle (specifically, an acute angle) formed by a tangent line in contact with a wall surface of the first groove on the downstream side in the sliding direction at a position of ⅓ of the depth of the first groove and the sliding direction.

The angle B means an angle (specifically, an acute angle) formed by a tangent line in contact with a wall surface of the first groove on the upstream side in the sliding direction at a position of ⅓ of the depth of the first groove and the sliding direction.

The depth of the first groove means a length from a reference line corresponding to a sliding surface between the first grooves adjacent to each other to a bottom point of the deepest first groove. The reference line is a line representing an arithmetic mean value of 10 measurements of the thickness of the sliding member at the center of the sliding surface between the first grooves adjacent to each other.

The width of the first groove means a length between edges of grooves intersecting a reference line corresponding to a sliding surface between the first grooves adjacent to each other. The pitch of the first grooves means a length between bottom points of the deepest first grooves in the adjacent first grooves.

The angle A, the angle B, the depth of the first groove, the width of the first groove, and the pitch of the first groove are each an arithmetic mean value obtained by measuring 10 points.

Figure 5:
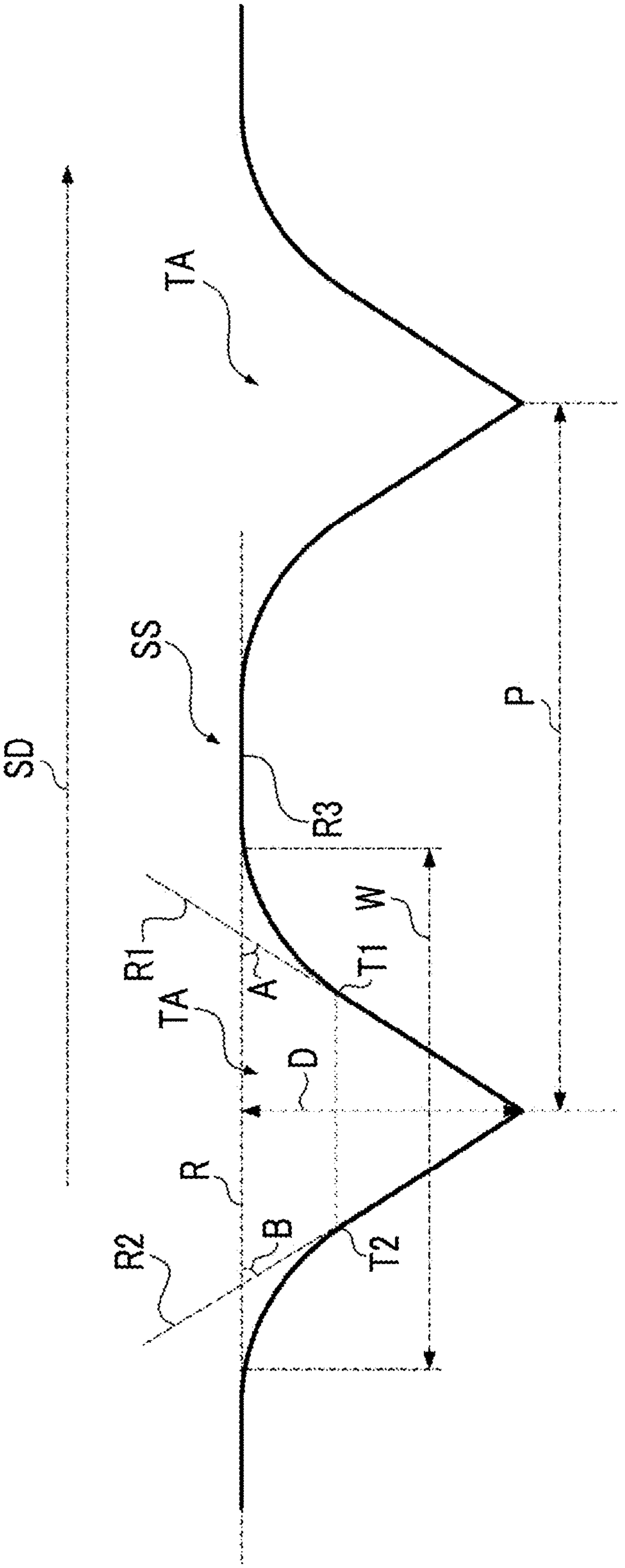
FIG. 5 is a schematic cross-sectional view showing an example of a sliding member according to the present exemplary embodiment.

Here, the reference numerals in FIG. 5 indicate the following items.

SS: sliding surface
TA: first groove
A: angle A
B: angle B
D: depth of first groove
W: width of first groove
P: pitch of first groove
SD: sliding direction
T1: wall surface of first groove on downstream side in sliding direction at position of ⅓ of depth of first groove
R1: tangent line in contact with wall surface of first groove on downstream side in sliding direction at position of ⅓ of depth of first groove
T2: wall surface of first groove on upstream side in sliding direction at position of ⅓ of depth of first groove
R2: tangent line in contact with wall surface of first groove on upstream side in sliding direction at position of ⅓ of depth of first groove
R3: center of sliding surface between adjacent first grooves
R: reference line corresponding to sliding surface between adjacent first grooves Here, in the sliding member according to the present exemplary embodiment, the aspect of the first groove is not limited to the above aspect.

Figure 6:
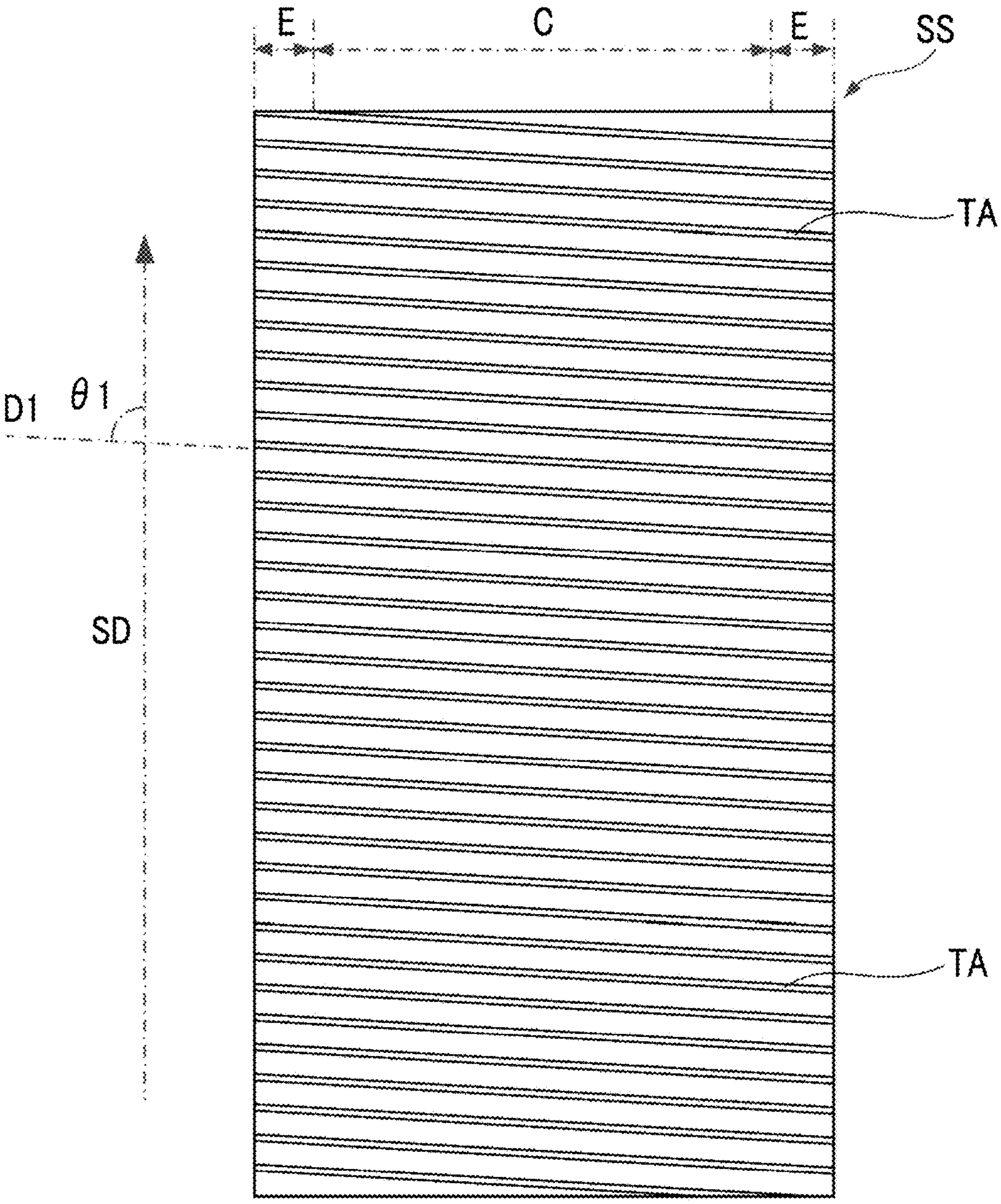
FIG. 6 is a schematic plan view showing another example of the sliding member according to the present exemplary embodiment.

The first groove may be inclined in the sliding direction (see FIG. 6). Specifically, the angle between the first groove and the sliding direction may be 45° or more and 90° or less.

The "angle between the first groove and the sliding direction" is an acute angle formed between the longitudinal direction of the first groove and the sliding direction.

The reference numerals in FIG. 6 indicate the following items. However, reference numerals other than the following items are the same as reference numerals shown in FIG. 3.

Figure 7:
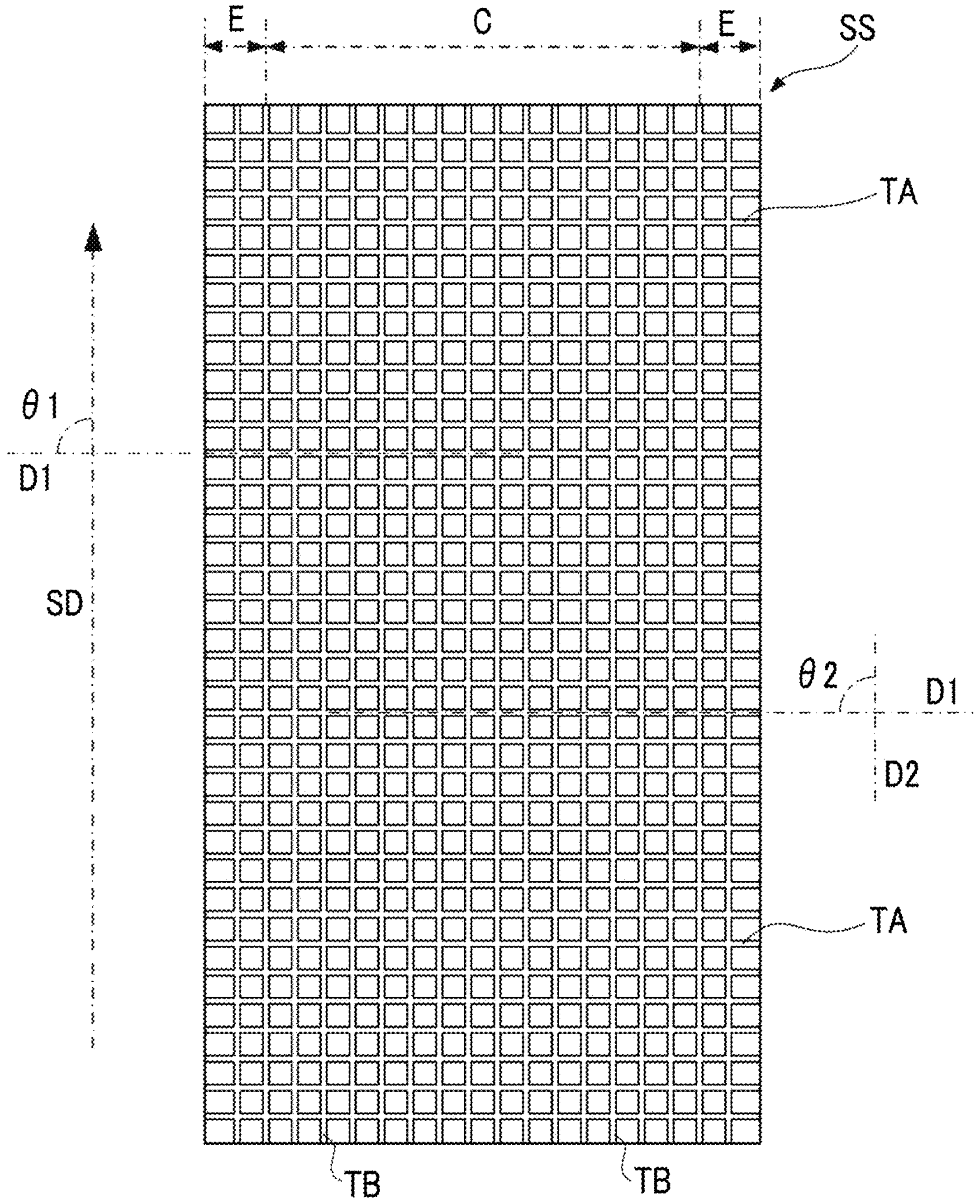
FIG. 7 is a schematic plan view showing still another example of the sliding member according to the present exemplary embodiment.
Figure 8:
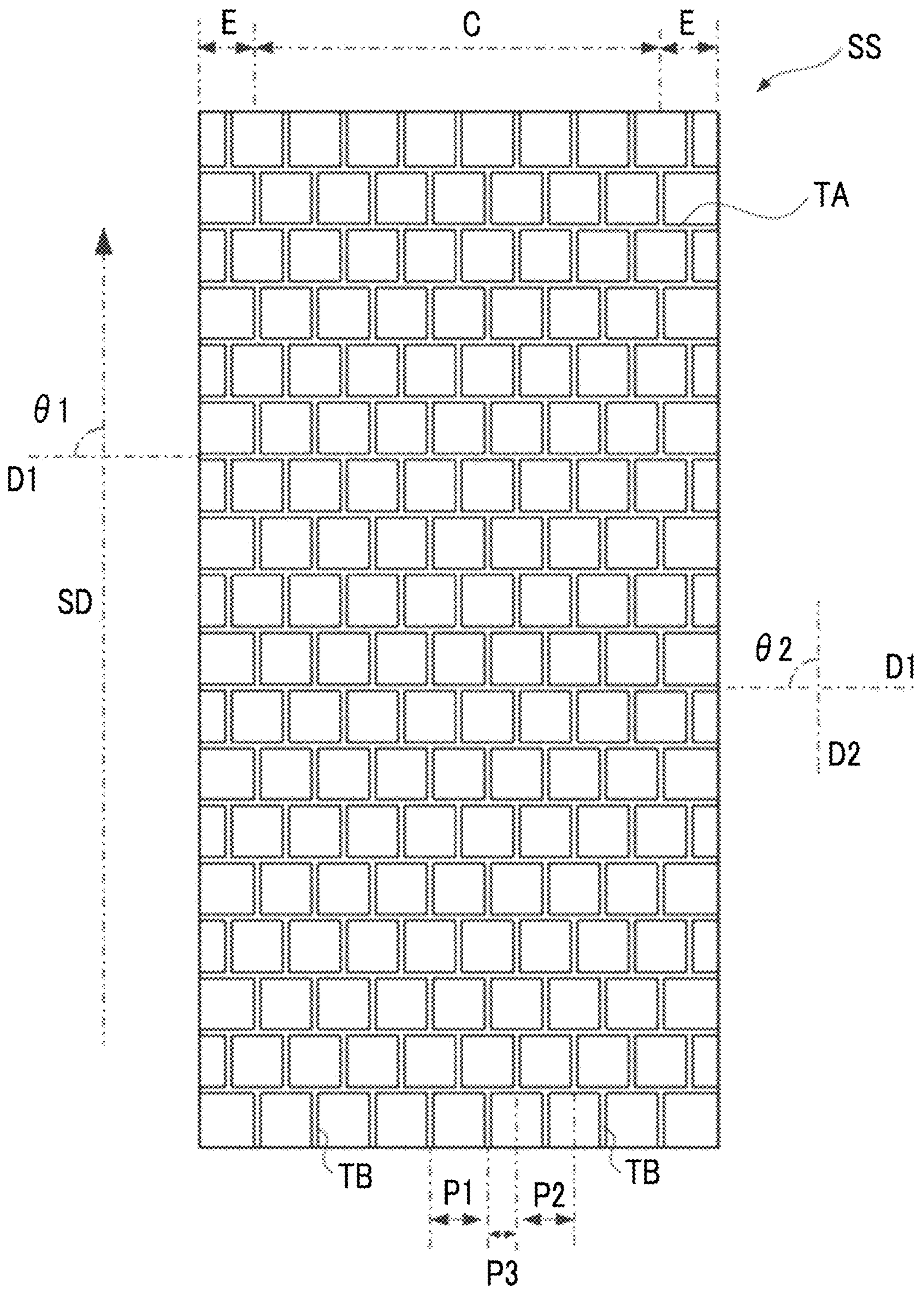
FIG. 8 is a schematic plan view showing still another example of the sliding member according to the present exemplary embodiment.

D1: longitudinal direction of first groove
θ1: angle formed by first groove and sliding direction In the sliding member according to the present exemplary embodiment, in addition to the first groove, a plurality of second grooves intersecting the groove of the first groove may be provided at intervals in the width direction of the second groove in the central portion of the sliding surface in the width direction (see FIGS. 7 and 8).

In the sliding member, wear debris is generated by sliding between solids, and is likely to be deposited in the first groove. On the other hand, by providing the second groove, the wear debris is easily discharged from the first groove. Therefore, the maintainability of the low sliding resistance is increased.

The second groove is, for example, preferably the same suitable range of the depth of the first groove, the width of the first groove, and the pitch of the first groove as the first groove.

The angle (see θ2 in FIGS. 7 and 8) formed by the first groove and the second groove is, for example, preferably 45° or more and 90° or less.

The "angle formed between the first groove and the second groove" indicates an acute angle formed between the longitudinal direction of the first groove and the longitudinal direction of the second groove.

Here, the aspect of the groove shown in FIG. 7 shows an aspect in which a first groove continuously provided along a direction perpendicular to the sliding direction and a second groove continuously provided along the sliding direction are provided.

In the aspect of the groove shown in FIG. 7, wear debris generated by the sliding between the solids is easily discharged. Therefore, the maintainability of the low sliding resistance is increased.

In the aspect of the groove shown in FIG. 7, the angle between the first groove and the sliding direction is 90°, and the angle between the first groove and the second groove is 90°.

The aspect of the groove shown in FIG. 8 shows an aspect in which a first groove that is continuously provided along a direction perpendicular to the sliding direction and a second groove intermittently provided along the sliding direction are provided.

In the aspect of the groove shown in FIG. 8, the lubricant is easily supplied from the first groove to the contact section between the sliding surface and the surface to be slid, and a discharge path for the wear debris is also secured. Therefore, the low sliding resistance and the maintainability of the low sliding resistance are easily improved.

In the aspect of the groove shown in FIG. 8, second grooves adjacent to each other are provided in a stepwise manner in the groove width direction with the first groove as a boundary. Specifically, the second grooves provided between the adjacent first grooves are provided in a ladder shape. That is, the first grooves and the second grooves are provided such that the sliding surface regions surrounded by the first grooves and the second grooves are arranged in a staggered pattern.

In the aspect of the groove shown in FIG. 8, the angle between the first groove and the sliding direction is 90°, and the angle between the first groove and the second groove is 90°.

In addition, the pitch of the second groove on one side (see P1 in FIG. 8) and the pitch of the second groove on the other side (see P2 in FIG. 8) with the first groove as a boundary are, for example, preferably the same range as the pitch of the first groove.

The staggered length of the second groove adjacent to the first groove (see P3 in FIGS. 7 and 8) is, for example, preferably 0.1 mm or more and 0.4 mm or less, and more preferably 0.2 mm or more and 0.25 mm or less.

The reference numerals in FIGS. 7 and 8 indicate the following items. However, reference numerals other than the following items are the same as reference numerals shown in FIG. 3.

D1: longitudinal direction of first groove

D2: longitudinal direction of second groove

θ1: angle formed by first groove and sliding direction

θ2: angle formed by first groove and second groove

P1: pitch of second groove on one side with first groove as boundary

P2: pitch of second groove on other side with first groove as boundary

P3: staggered length of adjacent second grooves with first groove as boundary TB: second groove For example, it is preferable that the cross-sectional area of the first groove gradually decreases from an upstream side in the sliding direction to a downstream side in the sliding direction.

For example, it is preferable that the cross-sectional area of the second groove gradually decreases from an upstream side in the sliding direction to a downstream side in the sliding direction.

Since the cross-sectional area of at least one of the first groove or the second groove is reduced, the lubricant easily enters the sliding surface. Therefore, the low sliding resistance and the maintainability of the low sliding resistance are easily improved.

Here, the "cross-sectional area of the groove" is a cross-sectional area in a case where the sliding member is cut in a direction perpendicular to the longitudinal direction of the groove and along the thickness direction.

The expression "the cross-sectional area of the groove gradually decreases from the upstream side in the sliding direction to the downstream side in the sliding direction" means any one of the following (1) or (2).

(1) In one groove, a cross-sectional area of the groove on the downstream side in the sliding direction is smaller than a cross-sectional area of the groove on the upstream side in the sliding direction.

(2) In the plurality of grooves, a cross-sectional area of a groove positioned on a downstream side in the sliding direction is smaller than a cross-sectional area of a groove positioned on an upstream side in the sliding direction.

Specifically, for example, it is preferable that a cross-sectional area B of the groove at a downstream end portion in the sliding direction is smaller than a cross-sectional area A of the groove at an upstream end portion in the sliding direction, in the sliding surface in contact with the surface to be slid.

The ratio (A/B) of the cross-sectional area A of the groove to the cross-sectional area B of the groove is, for example, preferably 1 or more and 9 or less, and more preferably 2 or more and 4 or less.

In order to adjust the cross-sectional area of each groove, for example, it is preferable to adjust the depth of the groove.

Specifically, the cross-sectional area of each groove at the upstream end portion in the sliding direction is, for example, preferably 700 $\mu m^2$ or more and 4300 $\mu m^2$ or less. The depth of each groove at the upstream end portion in the sliding direction is, for example, preferably 20 μm or more and 45 μm or less.

The cross-sectional area of each groove at the downstream end portion in the sliding direction is, for example, preferably 175 $\mu m^2$ or more and 1430 $\mu m^2$ or less. The depth of each groove at the downstream end portion in the sliding direction is, for example, preferably 5 μm or more and 45 μm or less.

In a case where the groove is not positioned at the upstream end portion or the downstream end portion in the sliding direction, the cross-sectional area and the depth of each groove are a cross-sectional area and a depth of each groove closest to the upstream end portion or the downstream end portion in the sliding direction.

As a method of providing the groove on the sliding surface, a well-known method such as press molding is adopted.

Next, a configuration of the sliding member according to the present exemplary embodiment will be described in detail.

It is preferable that, for example, the sliding sheet according to the present exemplary embodiment is configured with the sliding surface containing a heat-resistant thermoplastic resin.

Specifically, the sliding sheet according to the present exemplary embodiment is configured with a monolayer body of a resin base material layer containing a heat-resistant thermoplastic resin.

However, the sliding sheet may be a laminate of the resin base material layer and another layer provided on a side of the resin base material layer opposite to the sliding surface.

Examples of the heat-resistant thermoplastic resin include a polyimide resin, a polyether ether ketone resin, a polyphenylene sulfide resin, a polyetherimide resin, a polyphenyl sulfone resin, a polyether sulfone resin, a polysulfone resin, a polyphenyl sulfone resin, a polyamide resin, and a fluororesin.

Among the resins, as the heat-resistant thermoplastic resin, for example, at least one resin selected from the group consisting of the polyether ether ketone resin, the polyphenylene sulfide resin, the polyetherimide resin, and the polyphenyl sulfone resin is preferable, and at least one resin selected from the group consisting of the polyether ether ketone resin and the polyphenylene sulfide resin is more preferable.

These resins (in particular, the polyether ether ketone resin and the polyphenylene sulfide resin) are preferable, for example, since the resins have high wear resistance, a high toughness, and a high elastic modulus.

The resin base material layer constituting the sliding surface may contain known additives such as carbon fibers, carbon nanotubes, and resin particles having a siloxane group (particles such as a thermosetting silicone resin particle, a silicone oil gum, a silicone elastomer, and a siloxane-modified polyetherimide) for the purpose of reducing the sliding resistance of the sliding surface.

The resin base material layer constituting the sliding surface may also contain components such as a conductive agent, a filler for improving mechanical strength, an antioxidant for preventing thermal deterioration, a surfactant, and a heat-resistant antioxidant.

Fixing Device/Image Forming Apparatus

The fixing device according to the present exemplary embodiment includes a first rotating body, a second rotating body that is disposed in contact with the first rotating body, a pressing member that is disposed on an inner peripheral surface of the second rotating body and that presses the second rotating body against the first rotating body from the inner peripheral surface of the second rotating body, the sliding member interposed between the inner peripheral surface of the second rotating body and the pressing member, and a lubricant interposed between the inner peripheral surface of the second rotating body and the sliding member.

In the fixing device according to the present exemplary embodiment, the sliding member according to the present exemplary embodiment is applied as a sliding member.

The image forming apparatus according to the present exemplary embodiment includes an image holding body, a latent image forming device that forms a latent image on a surface of the image holding body, a development device that develops the latent image into a toner image using a developer, a transfer device that transfers the toner image developed onto a recording medium, and the fixing device that fixes the toner image on the recording medium. Further, the fixing device according to the present exemplary embodiment is applied to the image forming apparatus according to the present exemplary embodiment as a fixing device.

Hereinafter, an example of the fixing device and the image forming apparatus according to the present exemplary embodiment will be described with reference to the drawings.

Figure 2:
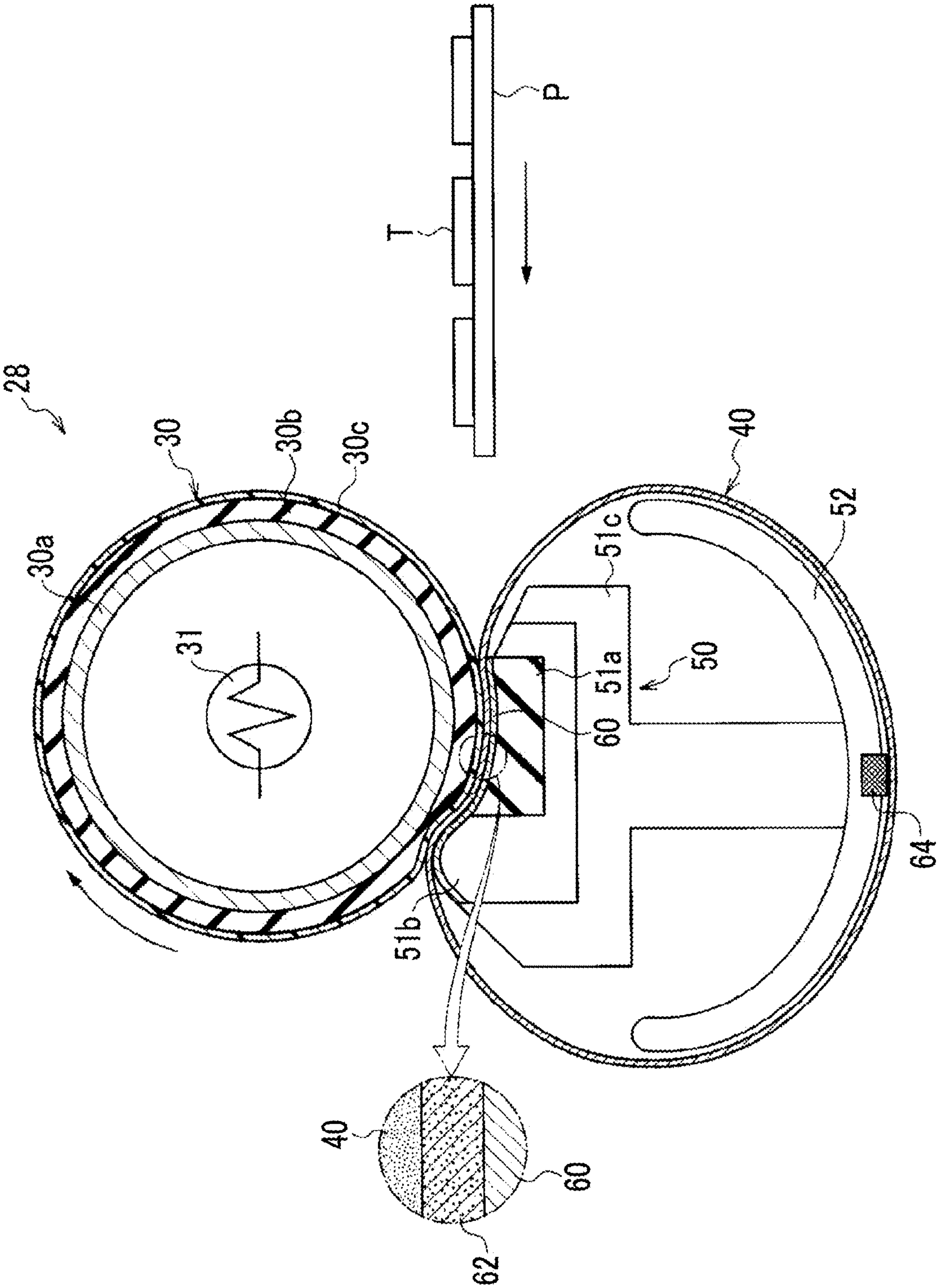
FIG. 2 is a schematic view showing an example of a fixing device according to the present exemplary embodiment.

FIG. 1 is a schematic view showing an example of an image forming apparatus according to the present exemplary embodiment. FIG. 2 is a schematic view showing an example of a fixing device according to the present exemplary embodiment.

Configuration of Image Forming Apparatus

As shown in FIG. 1, an image forming apparatus 100 according to the present exemplary embodiment includes first to fourth process cartridges 10Y, 10M, 10C, and 10K (an example of image forming units) in an electrophotographic method that outputs an image of each of colors, yellow (Y), magenta (M), cyan (C), and black (K), based on color-separated image data. These process cartridges 10Y, 10M, 10C, and 10K are arranged to be separated from each other along the outer peripheral surface of an intermediate transfer belt 20. Furthermore, these process cartridges 10Y, 10M, 10C, and 10K are detachable from a main body of the image forming apparatus.

The intermediate transfer belt 20 as an intermediate transfer body is provided above each of process cartridges 10Y, 10M, 10C, and 10K (in FIG. 1) so that an outer peripheral surface thereof faces each process cartridge. The intermediate transfer belt 20 is wound around a drive roller 22 disposed apart from each other and a support roller 24 in contact with the inner peripheral surface of the intermediate transfer belt 20 to be disposed under application of a tension and set to travel endlessly in a direction from the first process cartridge 10Y to the fourth process cartridge 10K.

Furthermore, the support roller 24 is pressed in a direction away from the drive roller 22 by an elastic member such as a spring which is not shown in the drawing, and a tension is applied to the intermediate transfer belt 20 wound between both the rollers. In addition, an intermediate transfer body cleaning device 20*a* facing the drive roller 22 is provided on the outer peripheral surface of the intermediate transfer belt 20.

Since the first to fourth process cartridges 10Y, 10M, 10C, and 10K have substantially the identical configuration, the first process cartridge 10Y forming a yellow image, disposed on the upstream side in the traveling direction of the intermediate transfer belt, will be described herein as a representative. Further, identical reference numerals marked with magenta (M), cyan (C), and black (K) instead of yellow (Y) are assigned to portions that are identical to the reference numerals in the first process cartridge 10Y, such that the description on the second to fourth process cartridges 10M, 10C, and 10K will not be repeated.

The first process cartridge 10Y has a photoreceptor 1Y that acts as an image holding body. Around the photoreceptor 1Y, a charging roller (an example of a charging device) 2Y that charges a surface of the photoreceptor 1Y to a predetermined potential, a development device 4Y that develops an electrostatic latent image by supplying a charged toner included in a developer to an electrostatic latent image, and a photoreceptor cleaning device 6Y that removes the toner remaining on a surface of the photoreceptor 1Y after the primary transfer are disposed in this order. These are integrally configured in a housing 11Y (housing). Similarly, in the second to fourth process cartridges 10M, 10C, and 10K, the respective members are integrally configured in housings 11M, 11C, and 11K (housing).

Together with the first process cartridge 10Y, a primary transfer roller 5Y (an example of a primary transfer device) that transfers the developed toner image onto the intermediate transfer belt 20, and an exposure device 3 that forms an electrostatic latent image by subjecting a charged surface to exposure with a laser beam 3Y based on a color-decomposed image signal are disposed to configure an image forming unit.

Furthermore, the charging roller 2Y and the exposure device 3 correspond to an example of a latent image forming device.

The primary transfer roller 5Y is disposed on the inner side of the intermediate transfer belt 20, at a position facing the photoreceptor 1Y. Further, a bias power supply (not shown) that applies a primary transfer bias is connected to each of the primary transfer rollers 5Y, 5M, 5C, and 5K. Each of the bias power supplies changes the transfer bias applied to each of the primary transfer rollers under the control of a controller which is not shown in the drawing.

Configuration of Fixing Device

As shown in FIG. 2, the fixing device 28 includes a heating roll 30 (an example of a first rotating body) and a pressurizing belt 40 (an example of a second rotating body), and the heating roll 30 and the pressurizing belt 40 are provided to face each other. The pressurizing belt 40 is pressed against the heating roll 30 by a pressing pad 50 (an example of a pressing member) disposed inside the periphery thereof, and is guided along a belt traveling guide 52 under a pressure contact to form a contact section and driven by receiving a driving force from the heating roll 30.

A sliding sheet 60 (an example of a sliding member) is interposed between the pressurizing belt 40 and the pressing pad 50. A lubricant 62 (an example of a lubricant) is interposed between the sliding sheet 60 and the inner peripheral surface of the pressurizing belt 40. Furthermore, the lubricant 62 is supplied onto the inner peripheral surface of the pressurizing belt 40 by, for example, a lubricant supply member 64 provided in a part of the belt traveling guide 52, and interposed between the sliding sheet 60 and the inner peripheral surface of the pressurizing belt 40.

Here, in FIG. 2, T represents a toner image.

Heating Roll 30 (One Example of First Rotating Body)

The heating roll 30 is configured, for example, by sequentially forming an elastic body layer 30*b* and a release layer 30*c* on a metal hollow core metal core 30*a* having a heating source 31 such as a halogen lamp inside.

The metal core 30*a* is configured with, for example, a cylindrical body made of a metal such as aluminum and stainless steel. The elastic body layer 30*b* is configured with, for example, HTV silicone rubber or fluororubber (a rubber hardness of JIS-A: about 45 degrees, and a rubber hardness based on JIS K6301, as measured by a spring type of Durometer Type A manufactured by Teclock Co., Ltd. under a load of 1,000 gf added) at a thickness of about 2 mm or more and 5 mm or less. The release layer 30*c* is configured with, for example, fluororubber, silicone rubber, or a fluororesin at a thickness of 20 μm or more and 50 μm or less. Obviously, the present invention is not limited to the materials, and materials that are known in the related art may be used.

In the heating roll 30, a speed of the fixing roll is adjusted by a drive source which is not shown in the drawing, and the fixing roll is rotationally driven, for example, at a peripheral speed of 260 mm/sec. The outer diameter of the heating roll 30 is generally, for example, about 25 mm or more and 80 mm or less.

A surface temperature of the heating roll 30 is detected by a temperature sensor coming into contact with the surface, which is not shown in the drawing, and is controlled by a control circuit which is not shown in the drawing, such that the surface temperature is, for example, 175° C.

Pressurizing Belt 40 (One Example of Second Rotating Body)

The inner peripheral surface of the pressurizing belt 40 is configured with, for example, a polyimide resin, a polyamideimide resin, a polyether ether ketone resin, a polyphenylene sulfide resin, a polyether sulfone resin, a polysulfone resin, a polyphenyl sulfone resin, or the like.

The resin base material layer may include other components in addition to the resin. Examples of such other components include a conductive agent, a filler for improving mechanical strength, an antioxidant for preventing thermal deterioration, a surfactant, and a heat-resistant antioxidant.

Here, the example in which the first rotating body is a heating roll and the second rotating body is a pressurizing belt has been described; however, an aspect in which the first rotating body is a pressurizing roll and the second rotating body is a heating belt is also included.

The configuration of the pressurizing roll in a case where the first rotating body is the pressurizing roll is, for example, preferably the same as the above-described configuration of the heating roll 30.

In a case where the second rotating body is a heating belt, the configuration of the heating belt is, for example, preferably the same as the above-described configuration of the pressurizing belt 40.

In particular, in a case where the second rotating body is a heating belt, the second rotating body may be a monolayer body of the resin base material layer constituting the inner peripheral surface of the heating belt, or may be a laminate having the resin base material layer constituting the inner peripheral surface of the heating belt, an elastic layer provided on the resin base material layer, and a release layer provided on the elastic layer; a laminate having the resin base material layer constituting the inner peripheral surface of the heating belt and a release layer provided on the resin base material layer; or a laminate having a metal layer on the resin base material layer constituting the inner peripheral surface of the heating belt and an elastic layer provided thereon, with a release layer being provided on the elastic layer.

The elastic layer will be described.

The elastic layer is configured to include a heat-resistant elastic material.

Examples of the heat-resistant elastic material include silicone rubber and fluororubber.

Examples of the silicone rubber include room-temperature vulcanizing (RTV) silicone rubber, high temperature vulcanizing (HTV) silicone rubber, and liquid silicone rubber. Specific examples thereof include polydimethyl silicone rubber, methylvinyl silicone rubber, methylphenyl silicone rubber, and fluorosilicone rubber.

Examples of the fluororubber include vinylidene fluoride-based rubber, ethylene tetrafluoride/propylene-based rubber, ethylene tetrafluoride/perfluoromethylvinyl ether rubber, phosphazene-based rubber, and fluoropolyether.

The elastic layer may include other components. Examples of such other components include a fillers, a conductive agent, a softener (such as a paraffin-based softener), a processing aid (such as stearic acid), an antioxidant (such as an amine-based antioxidant), a vulcanizing agent (such as sulfur, a metal oxide, and a peroxide), and a functional filler (such as alumina).

The release layer will be described.

The release layer includes, for example, a heat-resistant release material.

Examples of the heat-resistant release material include fluororubber, a fluororesin, a silicone resin, and a polyimide resin.

Among the materials, for example, the fluororesin is preferable as the heat-resistant release material. Specific examples of the fluororesin include polytetrafluoroethylene (PTFE); and tetrafluoroethylene-perfluoroalkylvinyl ether copolymers (PFA) such as a tetrafluoroethylene-perfluoromethylvinyl ether copolymer (MFA), a tetrafluoroethylene-perfluoroethylvinyl ether copolymer (EFA), and a tetrafluoroethylene-perfluoropropylvinyl ether copolymer. The examples further include a tetrafluoroethylene-hexafluoropropylene copolymer (FEP), an ethylene-tetrafluoroethylene copolymer (ETFE), a vinylidene polyvinylidene fluoride (PVDF), an ethylene trichlorotrifluoride (PCTFE), and a vinylpolyfluoride (PVF).

Among the fluororesins, the polytetrafluoroethylene (PTFE); and the tetrafluoroethylene-perfluoroalkylvinyl ether copolymers (PFA) such as the tetrafluoroethylene-perfluoromethylvinyl ether copolymer (MFA) and the tetrafluoroethylene-perfluoroethylvinyl ether copolymer (EFA) are used, particularly in terms of heat resistance, mechanical characteristics, and the like.

A thickness of the release layer is set to, for example, preferably 5 μm to 100 μm, and more preferably 10 μm to 30 μm.

Pressing Pad 50 (One Example of Pressing Member)

The pressing pad 50 has two pressing units 51*a* and 51*b* having different hardnesses along a traveling direction of a recording medium P. The pressing unit 51*a* on a recording medium P entry side in the pressing pad 50 is configured with a rubber-like elastic member, the pressing unit 51*b* on a recording medium P discharge side is configured with a hard pressure applying member such as a metal, and a pressure in a contact region on the recording medium P discharge side is set to be higher than that on the recording medium P entry side. The pressing units 51*a* and 51*b* are supported by a holder 51*c* and press the heating roll 30 from the inner peripheral surface of the pressurizing belt 40 via the sliding sheet 60 (an example of a sliding member).

Sliding Sheet 60 (One Example of Sliding Member)

The sliding member according to the present exemplary embodiment is applied to the sliding sheet 60.

Lubricant 62 (One Example of Lubricant)

Examples of the lubricant 62 include a fluorine oil, a silicone oil, and synthetic lubricating oil grease obtained by mixing a solid substance and a liquid.

Examples of the fluorine oil include a perfluoropolyether oil and a modified perfluoropolyether oil.

Examples of the silicone oil include dimethyl silicone oil, organic metal salt-added dimethyl silicone oil, hindered amine-added dimethyl silicone oil, organic metal salt-and hindered amine-added dimethyl silicone oil, methylphenyl silicone oil, amino-modified silicone oil, organic metal salt-added amino-modified silicone oil, hindered amine-added amino-modified silicone oil, carboxy-modified silicone oil, silanol-modified silicone oil, and sulfonic acid-modified silicone oil.

Examples of the synthetic lubricating oil grease include silicone grease (that is, grease containing the silicone oil described above) and fluorine grease (that is, grease containing the fluorine oil described above).

The lubricant 62 may include other components in addition to the oil. Examples of such other components include a grease (such as a silicon grease), a thermally conductive agent, an antioxidant, a surfactant, silicone particles, an organic metal salt, and a hindered amine.

Image Forming Operation of Image Forming Apparatus

Hereinafter, an image forming operation of the image forming apparatus according to the present exemplary embodiment will be described. Furthermore, an operation of forming a yellow image in the first process cartridge 10Y will be described as a representative of the image forming operation.

First, before the image forming operation, a surface of the photoreceptor 1Y is charged to, for example, about a potential of −600 V or more and −800 V or less by the charging roller 2Y.

The photoreceptor 1Y is formed by, for example, laminating a photosensitive layer on a conductive substrate. The photosensitive layer has, for example, properties in that this layer usually has a high resistance, but in a case of being irradiated with the laser beam 3Y, a specific resistance of a portion irradiated with the laser beam changes. Therefore, via the exposure device 3, the laser beam 3Y is output to a surface of the charged photoreceptor 1Y according to the image data for yellow transmitted from the control unit which is not shown in the drawing. The photosensitive layer on the surface of the photoreceptor 1Y is irradiated with the laser beam 3Y such that an electrostatic latent image of a yellow printing pattern is formed on the surface of the photoreceptor 1Y.

In this manner, the electrostatic latent image formed on the photoreceptor 1Y is rotated to a development position as the photoreceptor 1Y travels. At the development position, the electrostatic latent image on the photoreceptor 1Y is developed to form a visible image (toner image) by the development device 4Y.

For example, a developer including a yellow toner and a carrier is housed in the development device 4Y. The yellow toner is frictionally charged by being agitated inside in the development device 4Y, and has the same polarity (negative polarity) as the charged electric charge on the photoreceptor 1Y. As the surface of the photoreceptor 1Y passes through the development device 4Y, the yellow toner electrostatically adheres only to a neutralized latent image part on the surface of the photoreceptor 1Y, and the latent image is developed by the yellow toner. The photoreceptor 1Y on which the yellow toner image is formed continues to travel, and the developed toner image on the photoreceptor 1Y is transported to a primary transfer position.

In a case where the yellow toner image on the photoreceptor 1Y is transported to the primary transfer position, a primary transfer bias is applied to the primary transfer roller 5Y, an electrostatic force from the photoreceptor 1Y toward the primary transfer roller 5Y acts on the toner image, and the toner image on the photoreceptor 1Y is transferred to the intermediate transfer belt 20. The transfer bias applied at this time has a polarity (+) opposite to the polarity (−) of the toner. For example, in the first process cartridge 10Y, the transfer bias is subjected to a constant current control to about +10 μA by the controller (not shown).

In addition, the primary transfer biases applied to the primary transfer rollers 5M, 5C, and 5K after the second process cartridge 10M are also controlled in the same manner.

Thus, the intermediate transfer belt 20 to which the yellow toner image is transferred by the first process cartridge 10Y is sequentially transported through the second to fourth process cartridges 10M, 10C, and 10K, and the toner images of the respective colors are superimposed and transferred in layers in the same manner.

The intermediate transfer belt 20, to which toner images of all colors are transferred in layers through the first to fourth process cartridges, reaches a secondary transfer section configured with the intermediate transfer belt 20, the support roller 24 in contact with the inner peripheral surface of the intermediate transfer belt 20, and a secondary transfer roller (an example of a secondary transfer device) 26 disposed on the image holding surface side of the intermediate transfer belt 20. On the other hand, the recording medium P is fed to the gap between the secondary transfer roller 26 and the intermediate transfer belt 20 via feeding mechanism, and secondary transfer bias is applied to the support roller 24. The transfer bias applied at this time has the same polarity (−) as the polarity (−) of the toner, an electrostatic force from the intermediate transfer belt 20 toward the recording medium P acts on the toner image, and the toner image on the intermediate transfer belt 20 is transferred to the recording medium P. The secondary transfer bias at this time is determined according to the resistance detected by a resistance detection section (not shown) that detects the resistance of the secondary transfer section, and is controlled at a constant voltage thereof.

The intermediate transfer belt 20, the primary transfer roller 5Y, and the secondary transfer roller 26 correspond to an example of the transfer device.

After that, the recording medium P is sent to the fixing device 28, and inserted into a contact region formed by a pressure contact between the heating roll 30 rotationally driven in a direction of the arrow and the pressurizing belt 40. At this time, the recording medium P is inserted so that a surface of the recording medium P, on which an unfixed toner image has been formed, faces a surface of the heating roll 30. In a case where the recording medium P passes through the contact region, heat and pressure are applied to the recording medium P so that the unfixed toner image is fixed to the recording medium P. The recording medium P after fixing passes through the contact region, and then, is peeled off from the heating roll 30, and discharged from the fixing device 28.

In this manner, a fixing treatment is performed and the image is permanently fixed onto the recording medium P. The recording medium P, on which the fixing of the color image has been completed, is transported to a discharge section, and a series of color image forming operations is completed.

EXAMPLES

Hereinafter, Examples will be described below; however, the present invention is not limited to these Examples. In the following description, all "parts" and "%" are in terms of mass unless otherwise specified.

Examples 1 to 22 and Comparative Examples 1 to 3

A polyether ether ketone (PEEK) resin (Victrex 450G (manufactured by Victrex)) is melted by heating at 380° C. using a twin-screw extrusion melt kneader (twin-screw melt kneading extruder L/D60 (manufactured by Parker Corporation)), 10 parts by mass of unmodified thermosetting silicone resin particles ("KMP590" manufactured by Shin-Etsu Chemical Co., Ltd., average particle diameter=2 μm) are supplied to 100 parts by mass of the melted PEEK resin from the side of the kneader using a side feeder, and melt-kneaded. The kneaded melt product is put into a water tank to be cooled and solidified, and cut to a target size to obtain mixed resin pellets blended with silicone resin particles.

The obtained mixed resin pellets are put into a uniaxial extrusion machine, and the melted mixed resin is extruded into a sheet shape from a T-die mold (melt extrusion gap of 200 μm) heated to 380° C., wound around a cooling roll heated to 190° C., and cooled. The cooled sheet is heated to 250° C. between a mold roll and a heat-resistant silicone rubber roll at a pressure of 40 MPa, and the shape of the surface of the mold roll is imparted to form a plurality of grooves along the width direction at intervals in the longitudinal direction of the sheet, in the central portion and both end portions in the sheet width direction. As a result, a sheet is obtained. Then, the uneven sheet is cut into a predetermined size.

In this manner, a sliding sheet in which a surface, on which a plurality of grooves are provided at intervals in the sliding direction along the width direction in the central portion and both end portions of the sliding surface in the width direction is used as the sliding surface is obtained.

The shape of the groove is a V-shape and the dimensions shown in Table 1 in a case where a cut surface obtained by cutting the sliding sheet along the sliding direction and the thickness direction is observed.

Then, the shape of the groove is changed depending on the surface shape of the mold roll, and a sliding sheet of each example is obtained.

Comparative Example 3: Sliding Sheet in which Glass Cloth is Impregnated with Fluororesin A glass cloth impregnated with a fluororesin (product name: FGF400) manufactured by Chukoh Chemical Industries, Ltd., which obtained by impregnating a glass cloth with a PTFE resin dispersion, and subjecting the mixture to drying at 150° C., heating and baking at 380° C., and cooling, is used as a sliding sheet.

The notation in Table 1 indicates the following items.

Angle A: angle formed by wall surface of groove on downstream side in sliding direction and sliding direction in first groove in case where cut surface obtained by cutting sliding sheet along sliding direction and thickness direction is observed Angle B: angle formed by wall surface of groove on upstream side in sliding direction and sliding direction in first groove in case where cut surface obtained by cutting sliding sheet along sliding direction and thickness direction is observed Here, in Examples 20 to 22, the first groove and the second groove are provided as follows.

The first grooves are provided such that the width and the cross-sectional area of the first grooves positioned at the downstream end portion and the upstream end portion in the sliding direction are values shown in Table 1 and gradually decrease from the upstream side in the sliding direction to the downstream side in the sliding direction.

The second groove is provided such that the width and the cross-sectional area of one second groove are values shown in Table 1 at the downstream end portion in the sliding direction and the upstream end portion in the sliding direction, and gradually decrease from the upstream side in the sliding direction to the downstream side in the sliding direction.

In Examples 20 and 21, the pitch of the second groove shown in Table 1 corresponds to the pitch of the second groove on one side with the first groove as a boundary (see "P1" in FIG. 8) and the pitch of the second groove on the other side with the first groove as a boundary (see "P2" in FIG. 8), and the staggered length of the second grooves adjacent to each other with the first groove as a boundary is set to a dimension of ½ of the pitch of the first groove shown in Table 1.

Evaluation

The sliding sheet of each example is mounted on a fixing device of an image forming apparatus "Reveria Press EC1100" manufactured by Fujifilm Business Innovation Corp.

The following evaluations are performed using the image forming apparatus.

Initial Sliding Resistance

The friction coefficient of the sliding portion between the sliding sheet and the fixing member in the image forming apparatus is measured as follows. The measurement is performed before the paper is passed through the fixing device (that is, before the image formation is performed).

The current value of the motor that drives the heating roll, which is the drive roll of the fixing device, is measured. A calibration curve of the motor current value and the friction coefficient is drawn in advance, and the friction coefficient is calculated from the current value based on the calibration curve.

Then, the target friction coefficient is set to 0.08, and the evaluation is performed based on the following evaluation standard.

A++: The friction coefficient is less than 60% of the target friction coefficient.

A+: The friction coefficient is less than 70% of the target friction coefficient.

A: The friction coefficient is less than 80% of the target friction coefficient.

B+: The friction coefficient is 80% or more and 90% or less of the target friction coefficient.

B: The friction coefficient is 90% or more and 100% or less of the target friction coefficient.

C: The friction coefficient is more than 100% and 120% or less of the target friction coefficient.

D: The friction coefficient is more than 120% and 140% or less of the target friction coefficient.

E: The friction coefficient is more than 140% of the target friction coefficient.

Sliding Resistance Maintainability

Image formation is performed by an image forming apparatus, and 1,200,000 sheets of paper pass through a fixing device. Thereafter, the friction coefficient of the sliding portion between the sliding sheet and the fixing member in the image forming apparatus is measured in the same manner as the evaluation of the "initial sliding resistance". Then, the evaluation is performed based on the following evaluation standards.

A++: The friction coefficient is 40% or less of the above-described target friction coefficient (=0.08).

A+: The friction coefficient is 50% or less of the above-described target friction coefficient (=0.08).

A: The friction coefficient is 60% or less of the above-described target friction coefficient (=0.08).

B+: The friction coefficient is more than 60% and less than 70% of the above-described target friction coefficient ('0.08).

B: The friction coefficient is more than 70% and less than 80% of the target friction coefficient (=0.08).

C: The friction coefficient is 80% or more and less than 100% of the above-described target friction coefficient (=0.08).

D: The friction coefficient is 100% or more and 120% or less of the above-described target friction coefficient (=0.08).

E: The friction coefficient is more than 120% of the target friction coefficient (=0.08).

TABLE 1

| | | Dimension of first groove | | | | | | | | | | Dimension of second groove | | | | | | | Evaluation | |
|---|---|---|---|---|---|---|---|---|---|---|---|---|---|---|---|---|---|---|---|---|
| | | | | | | Depth | | Area | | | | | Depth | | Area | | | | | |
| | | | | | | Up-stream | Down-stream | Up-stream | Down-stream | | | | Up-stream | Down-stream | Up-stream | Down-stream | | | | |
| | Type of groove | Angle A | Angle B ° | A − B ° | Angle formed by sliding direction ° | end portion in sliding direction µm | end portion in sliding direction µm | end portion in sliding direction µm² | end portion in sliding direction µm² | Width µm | Pitch µm | Angle formed by first groove ° | end portion in sliding direction µm | end portion in sliding direction µm | end portion in sliding direction µm² | end portion in sliding direction µm² | Width µm | Pitch µm | Initial sliding resist-ance | Maintain-ability of sliding resist-ance |
| Example 1 | FIG. 3 | 25 | 15 | 10 | 90 | 35 | 35 | 2500 | 2500 | 135 | 440 | — | 35 | 35 | 2500 | 2500 | 135 | 440 | A++ | A |
| Example 2 | FIG. 3 | 21 | 15 | 6 | 90 | 35 | 35 | 2500 | 2500 | 135 | 440 | — | 35 | 35 | 2500 | 2500 | 135 | 440 | B | C |
| Example 3 | FIG. 3 | 23 | 15 | 8 | 90 | 35 | 35 | 2500 | 2500 | 135 | 440 | — | 35 | 35 | 2500 | 2500 | 135 | 440 | B+ | B+ |
| Example 4 | FIG. 3 | 40 | 15 | 25 | 90 | 35 | 35 | 2500 | 2500 | 135 | 440 | — | 35 | 35 | 2500 | 2500 | 135 | 440 | B+ | B+ |
| Example 5 | FIG. 3 | 45 | 15 | 30 | 90 | 35 | 35 | 2500 | 2500 | 135 | 440 | — | 35 | 35 | 2500 | 2500 | 135 | 440 | B | C |
| Example 6 | FIG. 3 | 25 | 8 | 17 | 90 | 35 | 35 | 2500 | 2500 | 135 | 440 | — | 35 | 35 | 2500 | 2500 | 135 | 440 | B | C |
| Example 7 | FIG. 3 | 25 | 10 | 15 | 90 | 35 | 35 | 2500 | 2500 | 135 | 440 | — | 35 | 35 | 2500 | 2500 | 135 | 440 | B | B |
| Example 8 | FIG. 3 | 25 | 15 | 10 | 90 | 35 | 35 | 2500 | 2500 | 135 | 440 | — | 35 | 35 | 2500 | 2500 | 135 | 440 | A++ | B+ |
| Example 9 | FIG. 3 | 40 | 30 | 10 | 90 | 35 | 35 | 2500 | 2500 | 135 | 440 | — | 35 | 35 | 2500 | 2500 | 135 | 440 | A++ | B+ |
| Example 10 | FIG. 3 | 45 | 35 | 10 | 90 | 35 | 35 | 2500 | 2500 | 135 | 440 | — | 35 | 35 | 2500 | 2500 | 135 | 440 | B | B |
| Example 11 | FIG. 3 | 45 | 37 | 8 | 90 | 35 | 35 | 2500 | 2500 | 135 | 440 | — | 35 | 35 | 2500 | 2500 | 135 | 440 | B | C |
| Example 12 | FIG. 3 | 25 | 22 | 3 | 90 | 35 | 35 | 2500 | 2500 | 135 | 440 | — | 35 | 35 | 2500 | 2500 | 135 | 440 | B | C |
| Example 13 | FIG. 3 | 25 | 20 | 5 | 90 | 35 | 35 | 2500 | 2500 | 135 | 440 | — | 35 | 35 | 2500 | 2500 | 135 | 440 | B | B |
| Example 14 | FIG. 3 | 25 | 18 | 7 | 90 | 35 | 35 | 2500 | 2500 | 135 | 440 | — | 35 | 35 | 2500 | 2500 | 135 | 440 | A++ | B+ |
| Example 15 | FIG. 3 | 43 | 18 | 25 | 90 | 35 | 35 | 2500 | 2500 | 135 | 440 | — | 35 | 35 | 2500 | 2500 | 135 | 440 | A++ | B+ |
| Example 16 | FIG. 3 | 45 | 15 | 30 | 90 | 35 | 35 | 2500 | 2500 | 135 | 440 | — | 35 | 35 | 2500 | 2500 | 135 | 440 | B | B |
| Example 17 | FIG. 3 | 45 | 13 | 32 | 90 | 35 | 35 | 2500 | 2500 | 135 | 440 | — | 35 | 35 | 2500 | 2500 | 135 | 440 | B | C |
| Example 18 | FIG. 3 | 25 | 15 | 10 | 90 | 40 | 40 | 2860 | 2860 | 135 | 440 | — | 40 | 40 | 2860 | 2860 | 135 | 440 | A++ | A |
| Example 19 | FIG. 3 | 25 | 15 | 10 | 90 | 35 | 35 | 2500 | 2500 | 135 | 500 | — | 35 | 35 | 2500 | 2500 | 135 | 500 | A++ | A |

TABLE 1-continued

| | Type of groove | Angle A | Angle B ° | A − B ° | Dimension of first groove: Angle formed by sliding direction ° | Depth: Upstream end portion in sliding direction µm | Depth: Downstream end portion in sliding direction µm | Area: Upstream end portion in sliding direction µm² | Area: Downstream end portion in sliding direction µm² | Width µm | Pitch µm | Dimension of second groove: Angle formed by first groove ° | Depth: Upstream end portion in sliding direction µm | Depth: Downstream end portion in sliding direction µm | Area: Upstream end portion in sliding direction µm² | Area: Downstream end portion in sliding direction µm² | Width µm | Pitch µm | Evaluation: Initial sliding resistance | Evaluation: Maintainability of sliding resistance |
|---|---|---|---|---|---|---|---|---|---|---|---|---|---|---|---|---|---|---|---|---|
| Example 20 | FIG. 8 | 25 | 15 | 10 | 90 | 35 | 10 | 2500 | 714 | 135 | 440 | 90 | 35 | 10 | 2500 | 714 | 135 | 440 | A++ | A+ |
| Example 21 | FIG. 8 | 25 | 15 | 10 | 90 | 35 | 35 | 2500 | 2500 | 135 | 440 | 90 | 35 | 35 | 2500 | 2500 | 135 | 440 | A+ | A+ |
| Example 22 | FIG. 7 | 25 | 15 | 10 | 90 | 35 | 10 | 2500 | 714 | 135 | 440 | 90 | 35 | 10 | 2500 | 714 | 135 | 440 | A | A+ |
| Comparative Example 1 | FIG. 3 | 18 | 15 | 8 | 90 | 35 | 35 | 2500 | 2500 | 135 | 440 | — | 35 | 35 | 2500 | 2500 | 135 | 440 | E | E |
| Comparative Example 2 | FIG. 3 | 47 | 15 | 32 | 90 | 35 | 35 | 2500 | 2500 | 135 | 440 | — | 35 | 35 | 2500 | 2500 | 135 | 440 | E | E |
| Comparative Example 3 | Cloth sheet impregnated with fluororesin | | | | | | | | | | | Cloth sheet impregnated with fluororesin | | | | | | | A | E |

From the above results, it is found that the sliding sheet of the present example has a low sliding resistance and excellent maintainability of the low sliding resistance as compared with the sliding sheet of the comparative example.

The present exemplary embodiment includes the following aspects.

(((1)))

A sliding member comprising:

a central portion of a sliding surface in a width direction provided with a plurality of first grooves at intervals along a width direction of the first grooves, wherein an angle formed by a first groove and a sliding direction is 45° or more and 90° or less, and in a case where a cut surface obtained by cutting the sliding member along a direction perpendicular to the first groove and along a thickness direction is observed, an angle A formed by a wall surface of the first groove on a downstream side in the sliding direction and the sliding direction in the first groove is 21° or more and 45° or less.

(((2)))

The sliding member according to (((1))), wherein in a case where the cut surface obtained by cutting the sliding member along the direction perpendicular to the first groove and along the thickness direction is observed, an angle B formed by a wall surface of the first groove on an upstream side in the sliding direction and the sliding direction in the first groove is 10° or more and 35° or less.

(((3)))

The sliding member according to (((1))) or (((2))) wherein, as the first grooves, a plurality of grooves along the width direction of the sliding surface are provided at intervals in the sliding direction.

(((4)))

The sliding member according to any one of (((1))) to (((3))), wherein a plurality of second grooves are provided at intervals along a width direction of the second grooves in the central portion of the sliding surface in the width direction, and an angle formed by the first groove and a second groove is 45° or more and 90° or less.

(((5)))

The sliding member according to ((4)), wherein the first groove is continuously provided along a direction perpendicular to the sliding direction, and the second groove is intermittently provided along the sliding direction.

((6))

The sliding member according to any one of (((1))) to (((5))), wherein a cross-sectional area of the first groove gradually decreases from the upstream side in the sliding direction to the downstream side in the sliding direction.

(((7)))

The sliding member according to (((4))), wherein a cross-sectional area of the second groove gradually decreases from the upstream side in the sliding direction to the downstream side in the sliding direction.

((8)

The sliding member according to any one of (((1))) to (((7))), wherein the angle A is 23° or more and 40° or less.

(((9)))

The sliding member according to (((2))), wherein the angle B is 15° or more and 30° or less.

(((10)))

The sliding member according to (((2))), wherein a difference between the angle A and the angle B is 5° or more and 30° or less in terms of absolute value.

(((11))

The sliding member according to (((10))), wherein the difference between the angle A and the angle B is 7° or more and 25° or less in terms of absolute value.

(((12)))

A fixing device comprising:

a first rotating body;

a second rotating body that is disposed in contact with the first rotating body;

a pressing member that is disposed on an inner peripheral surface of the second rotating body and presses the second rotating body against the first rotating body from the inner peripheral surface of the second rotating body;

the sliding member according to any one of (((1))) to (((11))) that is interposed between the inner peripheral surface of the second rotating body and the pressing member; and a lubricant that is interposed between the inner peripheral surface of the second rotating body and the sliding member.

(((13)))

An image forming apparatus comprising:

an image holding body;

a latent image forming device that forms a latent image on a surface of the image holding body;

a development device that develops the latent image into a toner image using a developer;

a transfer device that transfers the toner image developed onto a recording medium; and the fixing device according to (((12))) that fixes the toner image on the recording medium.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A sliding member comprising:

a central portion of a sliding surface in a width direction provided with a plurality of first grooves at intervals along a width direction of the first grooves, wherein an angle formed by a first groove and a sliding direction is 45° or more and 90° or less, and in a case where a cut surface obtained by cutting the sliding member along a direction perpendicular to the first groove and along a thickness direction is observed, an angle A formed by a wall surface of the first groove on a downstream side in the sliding direction and the sliding direction in the first groove is 21° or more and 45° or less, wherein a length of the first groove in the width direction of the sliding surface is longer than a width of the first groove in the sliding direction.

2. The sliding member according to claim 1, wherein in a case where the cut surface obtained by cutting the sliding member along the direction perpendicular to the first groove and along the thickness direction is observed, an angle B formed by a wall surface of the first groove on an upstream side in the sliding direction and the sliding direction in the first groove is 10° or more and 35° or less.

3. The sliding member according to claim 1, wherein, as the first grooves, a plurality of elongated grooves along the width direction of the sliding surface are provided at intervals in the sliding direction.

4. The sliding member according to claim 1, wherein a plurality of second grooves are provided at intervals along a width direction of the second grooves in the central portion of the sliding surface in the width direction, and an angle formed by the first groove and a second groove is 45° or more and 90° or less.

5. The sliding member according to claim 4, wherein the first groove is continuously provided along a direction perpendicular to the sliding direction, and the second groove is intermittently provided along the sliding direction.

6. The sliding member according to claim 1, wherein a cross-sectional area of the first groove gradually decreases from the upstream side in the sliding direction to the downstream side in the sliding direction.

7. The sliding member according to claim 4, wherein a cross-sectional area of the second groove gradually decreases from the upstream side in the sliding direction to the downstream side in the sliding direction.

8. The sliding member according to claim 1, wherein the angle A is 23° or more and 40° or less.

9. The sliding member according to claim 2, wherein the angle B is 15° or more and 30° or less.

10. The sliding member according to claim 2, wherein a difference between the angle A and the angle B is 5° or more and 30° or less in terms of absolute value.

11. The sliding member according to claim 10, wherein the difference between the angle A and the angle B is 7° or more and 25° or less in terms of absolute value.

12. A fixing device comprising:

a first rotating body;

a second rotating body that is disposed in contact with the first rotating body;

a pressing member that is disposed on an inner peripheral surface of the second rotating body and presses the second rotating body against the first rotating body from the inner peripheral surface of the second rotating body;

the sliding member according to claim 1 that is interposed between the inner peripheral surface of the second rotating body and the pressing member; and a lubricant that is interposed between the inner peripheral surface of the second rotating body and the sliding member.

13. A fixing device comprising:

a first rotating body;

a second rotating body that is disposed in contact with the first rotating body;

a pressing member that is disposed on an inner peripheral surface of the second rotating body and presses the second rotating body against the first rotating body from the inner peripheral surface of the second rotating body;

the sliding member according to claim 2 that is interposed between the inner peripheral surface of the second rotating body and the pressing member; and a lubricant that is interposed between the inner peripheral surface of the second rotating body and the sliding member.

14. A fixing device comprising:

a first rotating body;

a second rotating body that is disposed in contact with the first rotating body;

a pressing member that is disposed on an inner peripheral surface of the second rotating body and presses the second rotating body against the first rotating body from the inner peripheral surface of the second rotating body;

the sliding member according to claim 3 that is interposed between the inner peripheral surface of the second rotating body and the pressing member; and a lubricant that is interposed between the inner peripheral surface of the second rotating body and the sliding member.

15. A fixing device comprising:

a first rotating body;

a second rotating body that is disposed in contact with the first rotating body;

a pressing member that is disposed on an inner peripheral surface of the second rotating body and presses the second rotating body against the first rotating body from the inner peripheral surface of the second rotating body;

the sliding member according to claim 4 that is interposed between the inner peripheral surface of the second rotating body and the pressing member; and a lubricant that is interposed between the inner peripheral surface of the second rotating body and the sliding member.

16. A fixing device comprising:

a first rotating body;

a second rotating body that is disposed in contact with the first rotating body;

a pressing member that is disposed on an inner peripheral surface of the second rotating body and presses the second rotating body against the first rotating body from the inner peripheral surface of the second rotating body;

the sliding member according to claim 5 that is interposed between the inner peripheral surface of the second rotating body and the pressing member; and a lubricant that is interposed between the inner peripheral surface of the second rotating body and the sliding member.

17. A fixing device comprising:

a first rotating body;

a second rotating body that is disposed in contact with the first rotating body;

a pressing member that is disposed on an inner peripheral surface of the second rotating body and presses the second rotating body against the first rotating body from the inner peripheral surface of the second rotating body;

the sliding member according to claim 6 that is interposed between the inner peripheral surface of the second rotating body and the pressing member; and a lubricant that is interposed between the inner peripheral surface of the second rotating body and the sliding member.

18. A fixing device comprising:

a first rotating body;

a second rotating body that is disposed in contact with the first rotating body;

a pressing member that is disposed on an inner peripheral surface of the second rotating body and presses the second rotating body against the first rotating body from the inner peripheral surface of the second rotating body;

the sliding member according to claim 7 that is interposed between the inner peripheral surface of the second rotating body and the pressing member; and a lubricant that is interposed between the inner peripheral surface of the second rotating body and the sliding member.

19. A fixing device comprising:

a first rotating body;

a second rotating body that is disposed in contact with the first rotating body;

a pressing member that is disposed on an inner peripheral surface of the second rotating body and presses the second rotating body against the first rotating body from the inner peripheral surface of the second rotating body;

the sliding member according to claim 8 that is interposed between the inner peripheral surface of the second rotating body and the pressing member; and a lubricant that is interposed between the inner peripheral surface of the second rotating body and the sliding member.

20. An image forming apparatus comprising:

an image holding body;

a latent image forming device that forms a latent image on a surface of the image holding body;

a development device that develops the latent image into a toner image using a developer;

a transfer device that transfers the toner image developed onto a recording medium; and the fixing device according to claim 12 that fixes the toner image on the recording medium.

* * * * *